US009586182B2

(12) United States Patent
Umehara et al.

(10) Patent No.: US 9,586,182 B2
(45) Date of Patent: Mar. 7, 2017

(54) PROCESS FOR PREPARING MEMBRANES

(71) Applicant: Fujifilm Manufacturing Europe BV, Tilburg (NL)

(72) Inventors: Takeshi Umehara, Tilburg (NL); Petrus Van Kessel, Tilburg (NL); Yujiro Itami, Tilburg (NL)

(73) Assignee: Fujifilm Manufacturing Europe BV (NL)

( * ) Notice: Subject to any disclaimer, the term of this patent is extended or adjusted under 35 U.S.C. 154(b) by 315 days.

(21) Appl. No.: 14/408,808

(22) PCT Filed: Jun. 26, 2013

(86) PCT No.: PCT/GB2013/051684
§ 371 (c)(1),
(2) Date: Dec. 17, 2014

(87) PCT Pub. No.: WO2014/001795
PCT Pub. Date: Jan. 3, 2014

(65) Prior Publication Data
US 2015/0209733 A1    Jul. 30, 2015

(30) Foreign Application Priority Data
Jun. 26, 2012  (GB) .................................. 1211309.8

(51) Int. Cl.
| B01D 53/22 | (2006.01) |
| B01D 69/12 | (2006.01) |
| B01D 63/08 | (2006.01) |
| B01D 71/64 | (2006.01) |
| B01D 71/70 | (2006.01) |
| B01D 67/00 | (2006.01) |
| B01D 71/16 | (2006.01) |
| B01D 71/32 | (2006.01) |
| B01D 71/82 | (2006.01) |
| B01D 69/08 | (2006.01) |
| B05D 3/06 | (2006.01) |
| B01D 71/62 | (2006.01) |

(52) U.S. Cl.
CPC ........... *B01D 69/12* (2013.01); *B01D 53/228* (2013.01); *B01D 63/08* (2013.01); *B01D 67/0006* (2013.01); *B01D 67/006* (2013.01); *B01D 67/0081* (2013.01); *B01D 67/0095* (2013.01); *B01D 69/08* (2013.01); *B01D 69/125* (2013.01); *B01D 71/16* (2013.01); *B01D 71/32* (2013.01); *B01D 71/62* (2013.01); *B01D 71/64* (2013.01); *B01D 71/70* (2013.01); *B01D 71/82* (2013.01); *B05D 3/06* (2013.01); *B01D 2053/221* (2013.01); *B01D 2053/224* (2013.01); *B01D 2323/30* (2013.01); *B01D 2323/34* (2013.01); *B01D 2323/345* (2013.01); *B01D 2323/40* (2013.01); *B01D 2325/023* (2013.01); *B01D 2325/04* (2013.01); *B01D 2325/20* (2013.01); *Y02C 10/10* (2013.01)

(58) Field of Classification Search
CPC ................ B01D 69/12; B01D 2323/34; B01D 2325/023; B01D 67/0006; B01D 2325/20; B01D 53/228; B01D 71/32; B01D 2325/04; B01D 69/08; B01D 2323/40; B01D 63/08; B01D 71/82; B01D 2053/221; B01D 71/64; B01D 71/16; B01D 3/06; B01D 69/125; B01D 67/0095; B01D 67/006; B01D 71/70; B01D 2053/224; B01D 67/0081; B01D 71/62; B01D 71/46; B01D 2323/345; B01D 2323/30; Y02C 10/10
See application file for complete search history.

(56) References Cited

U.S. PATENT DOCUMENTS

| 3,899,309 | A |  | 8/1975 | Hoehn et al. |
| 4,394,294 | A | * | 7/1983 | Gryaznov ............ B01J 31/1633 502/158 |
| 4,484,935 | A |  | 11/1984 | Zampini |
| 4,717,394 | A |  | 1/1988 | Hayes |
| 4,933,082 | A |  | 6/1990 | Yamada et al. |
| 5,085,676 | A |  | 2/1992 | Ekiner et al. |
| 5,286,280 | A |  | 2/1994 | Chiou |
| 5,650,453 | A |  | 7/1997 | Eckberg et al. |
| 5,661,092 | A | * | 8/1997 | Koberstein ............ B05D 1/208 427/226 |
| 5,666,642 | A | * | 9/1997 | Hawthorne ............ C01D 17/00 210/638 |

(Continued)

FOREIGN PATENT DOCUMENTS

| WO | 03084651 A1 | 10/2003 |
| WO | 2007018425 A1 | 2/2007 |

OTHER PUBLICATIONS

International Preliminary Report on Patentability dated Jan. 8, 2015, issued from corresponding PCT/GB2013/051684.

*Primary Examiner* — Anthony Shumate
(74) *Attorney, Agent, or Firm* — Banner & Witcoff, Ltd.

(57) ABSTRACT

A process for preparing a composite membrane comprising the steps: a) applying a radiation-curable composition to a porous support; b) irradiating the composition and thereby forming a gutter layer of cured polymer; and c) forming a discriminating layer on the gutter layer; wherein the radiation-curable composition comprises a partially crosslinked, radiation-curable polymer comprising epoxy groups and siloxane groups, a photoinitiator and is substantially free from mono-epoxy compounds. Composite membranes and gas separation cartridges are also claimed.

20 Claims, No Drawings

(56) References Cited

U.S. PATENT DOCUMENTS

| | | | | |
|---|---|---|---|---|
| 6,432,376 B1* | 8/2002 | Choudhary | | B01J 23/44 423/584 |
| 6,756,019 B1* | 6/2004 | Dubrow | | B01L 3/502715 422/500 |
| 2005/0204920 A1* | 9/2005 | Hong | | B01D 53/228 96/4 |
| 2006/0076236 A1* | 4/2006 | Shah | | A61B 5/14532 204/403.01 |
| 2007/0135698 A1* | 6/2007 | Shah | | C12Q 1/006 600/348 |
| 2007/0227907 A1* | 10/2007 | Shah | | G01N 27/307 205/777.5 |
| 2008/0171156 A1* | 7/2008 | Olijve | | B01D 67/0006 428/32.26 |
| 2008/0171188 A1* | 7/2008 | Van Baak | | B01D 65/08 428/305.5 |
| 2008/0182044 A1* | 7/2008 | Itami | | B01D 69/125 428/32.26 |
| 2008/0182914 A1* | 7/2008 | Itami | | B01D 67/0006 521/50.5 |
| 2008/0193735 A1* | 8/2008 | Hessing | | B01D 65/08 428/304.4 |
| 2009/0202813 A1* | 8/2009 | Itami | | B01D 67/0006 428/319.3 |
| 2010/0154641 A1 | 6/2010 | Kase et al. | | |
| 2010/0189631 A1* | 7/2010 | Noszticzius | | B01D 63/087 423/477 |
| 2010/0210745 A1* | 8/2010 | McDaniel | | C09D 5/008 521/55 |
| 2010/0224551 A1* | 9/2010 | Hongo | | B01D 63/087 210/454 |
| 2012/0196376 A1* | 8/2012 | Park | | B81C 1/00071 436/94 |
| 2012/0297976 A1* | 11/2012 | Sano | | B01D 53/22 95/47 |

* cited by examiner

PROCESS FOR PREPARING MEMBRANES

RELATED APPLICATION DATA

This application is a National Stage Application under 35 U.S.C. 371 of co-pending PCT application PCT/GB2013/051684 designating the United States and filed Jun. 26, 2013; which claims the benefit of GB application number 1211309.8 and filed Jun. 26, 2012 each of which are hereby incorporated by reference in their entireties.

This invention relates to composite membranes and to processes for their preparation and use, particularly for separating gases.

The use of membranes to separate gases is known in the art. The known separation processes are based on differences in the relative permeability of two or more gases through a membrane. Typically a mixture of gasses is brought into contact with one side of a membrane through which at least one of the gases permeates faster than the other gases. In this way a gas stream is separated into two streams, one of which is enriched in the selectively permeating gas(es).

From a gas flux point of view, very thin membranes are preferred. However thin membranes are weaker than thicker membranes and run a greater risk of tearing, bursting and mechanical damage.

To improve the mechanical strength of membranes, without compromising gas flux rates, it is not uncommon to use composite membranes comprising a porous support and a thin, gas discriminating layer. The porous support does not discriminate between gases but instead it provides mechanical strength. The gas discriminating layer on the other hand performs the task of selectively allowing one or more gases to pass through more easily than other gases, providing a degree of gas separation and enrichment. In this way higher flux rates can be achieved than if an unsupported, thick discriminating membrane were used, while at the same time the mechanical strength and durability of the membrane is enhanced.

U.S. Pat. No. 5,286,280 describes the preparation of composite membranes comprising a porous support, an intermediate gutter layer and a discriminating layer made from what is known as a "6FDA" type polyimide. The intermediate gutter layer is formed by a thermal curing process which takes about 20 minutes to 2 hours. The gutter layer is obtained by thermally curing a composition comprising vinyl-terminated organopolysiloxanes. Further the manufacturing process of U.S. Pat. No. 5,286,280 was therefore rather slow, it resulted in relatively thick membranes and used relatively large amounts of chemicals.

We have now devised a way of producing composite membranes with high $CO_2/CH_4$ selectivity and flux rates.

According to a first aspect of the present invention there is provided a process for preparing a composite membrane comprising the steps:
a) applying a radiation-curable composition to a porous support;
b) irradiating the composition and thereby forming a gutter layer of cured polymer;
c) forming a discriminating layer on the gutter layer;
wherein the radiation-curable composition comprises a partially crosslinked, radiation-curable polymer comprising epoxy groups and siloxane groups, a photoinitiator and is substantially free from mono-epoxy compounds The term 'curing' and the term 'crosslinking' are used interchangeably in this specification.

The gutter layer may also be referred to as a layer of cured polymer, but for brevity in this specification we usually refer to it as a "gutter layer".

In this specification the partially crosslinked, radiation-curable polymer comprising epoxy groups and siloxane groups is often abbreviated in this specification to "the PCP Polymer".

Mono-epoxy compounds have one (i.e. only one) epoxy group.

The primary purpose of the porous support is to provide mechanical strength to the discriminating layer without materially reducing the flux. Therefore the porous support is typically open pored, relative to the discriminating layer.

The porous support may be, for example, a microporous organic or inorganic membrane, or a woven or non-woven fabric. The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use, for example, a commercially available, porous sheet material as the support. Alternatively one may prepare the porous support using techniques generally known in the art for the preparation of microporous materials. In one embodiment one may prepare a porous, non-discriminatory support by curing curable components, then applying further curable components to the formed porous support and curing such components thereby forming the layer of cured polymer and the discriminating layer on the already cured porous support.

The porous support is not limited to sheet form; also porous supports in tubular form like hollow fibres can be used.

One may also use a porous support which has been subjected to a corona discharge treatment, glow discharge treatment, flame treatment, ultraviolet light irradiation treatment or the like, e.g. for the purpose of improving its wettability and/or adhesiveness. Such a treatment may even be applied between steps b) and c) of the present process if desired.

The porous support preferably possesses pores which are as large as possible, consistent with providing a smooth surface for the gutter layer and subsequent discriminating layer. The porous support preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 µm, preferably 0.01 to 1 µm. The pores at the surface of the porous support will typically have a diameter of 0.001 to 0.1 µm, preferably 0.005 to 0.05 µm. The pore diameter may be determined by, for example, viewing the surface of the porous support by scanning electron microscopy ("SEM") or by cutting through the support and measuring the diameter of the pores within the porous support, again by SEM.

The porosity at the surface of the porous support may also be expressed as a % porosity, i.e.

$$\% \text{ porosity} = 100\% \times \frac{\text{(area of the surface which is missing due to pores)}}{\text{(total surface area)}}$$

The areas required for the above calculation may be determined by inspecting the surface of the porous support using a SEM. Thus, in a preferred embodiment, the porous support has a % porosity >1%, more preferably >3%, especially >10%, more especially >20%.

The porosity of the porous support may also be expressed as a $CO_2$ gas permeance (units are $m^3(STP)/m^2 \cdot s \cdot kPa$). When the composite membrane is intended for use in gas separation the porous support preferably has a $CO_2$ gas permeance of 5 to $150 \times 10^{-5}$ $m^3(STP)/m^2 \cdot s \cdot kPa$, more preferably of 5 to 100, most preferably of 7 to $70 \times 10^{-5}$ $m^3(STP)/m^2 \cdot s \cdot kPa$.

Alternatively the porosity is characterised by measuring the $N_2$ gas flow rate through the porous support. Gas flow rate can be determined by any suitable technique, for example using a Porolux™ 1000 device, available from Porometer.com. Typically the Porolux™ 1000 is set at the maximum pressure (about 34 bar) and one measures the flow rate (L/min) of $N_2$ gas through the porous support under test. The $N_2$ flow rate through the porous support at a pressure of about 34 bar for an effective sample area of 2.69 $cm^2$ (effective diameter of 18.5 mm) is preferably >1 L/min, more preferably >5 L/min, especially >10 L/min, more especially >25 L/min. The higher of these flow rates are preferred because this reduces the likelihood of the gas flux of the resultant composite membrane being reduced by the porous support.

The abovementioned % porosity and permeance refer to the porous support used to make the composite membrane (i.e. before step a) has been performed).

The porous support preferably has an average thickness of 20 to 500 μm, preferably 50 to 400 μm, especially 100 to 300 μm.

One may use an ultrafiltration membrane as the porous support, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane. Asymmetric ultrafiltration membranes may be used, including those comprising a porous polymer membrane (preferably of thickness 10 to 150 μm, more preferably 20 to 100 μm) and optionally a woven or non-woven fabric support. The porous support is preferably as thin as possible, provided it retains the desired structural strength.

If desired, one may prevent the curable composition from permeating deeply into the porous support by any of a number of techniques. For example, one may select a curable composition which has a sufficiently high viscosity to make such permeation unlikely. With this in mind, the radiation-curable composition preferably has a viscosity of 0.1 to 500 Pa·s at 25° C., more preferably 0.1 to 100 Pa·s at 25° C.

Alternatively, the process optionally comprises the step of filling the pores of the porous support with an inert liquid before applying the radiation-curable composition to the porous support. This technique has an advantage over the first technique mentioned above in that one may form thinner membranes and more application techniques are available for lower viscosity, radiation curable compositions.

Another option for ensuring the curable composition does not permeate excessively into the porous support is to increase the hydrodynamic radius ($R_{hyd}$) of the PCP Polymer. $R_{hyd}$ may be increased by increasing the extent to which the PCP Polymer is crosslinked. $R_{hyd}$ can be suitably determined by dynamic light scattering.

Preferably the $R_{hyd}$ of the PCP Polymer is more than half the average diameter of at least 50% of the pores at the surface of the porous support. Some degree of permeation is preferred to achieve a good adhesion.

The process of the present invention optionally comprises the step of preparing the PCP Polymer. For example, one may partially cure a composition comprising one or more curable components (e.g. monomers, oligomers and/or polymers), at least one of which comprises epoxy groups.

Preferably the partial cure is performed by a thermally initiated polymerisation process.

In a preferred embodiment, at least one of the curable components comprises a group which is both thermally curable and radiation curable. This is because one may then use a thermally initiated process for preparing the PCP Polymer and subsequently use a radiation initiated process for forming the gutter layer in step b).

Alternatively, the thermally curable group and the radiation curable groups are different groups and are part of the same component used to from the PCP Polymer.

As thermal curing is a relatively slow process, one may partially cure the curable components thermally to form the PCP Polymer, then stop or slow down the thermal cure process, then apply a composition containing the PCP Polymer to the support (step a)) in the form of a composition comprising an inert solvent, and then irradiate the composition on the support to form a gutter layer on the support (step b)). The thermal cure process may be stopped or slowed down simply by cooling (e.g. to below 30° C.) and/or diluting the composition used to make the PCP Polymer at an appropriate time.

The use of two distinct mechanisms for preparing the PCP Polymer and for the final curing after the PCP Polymer has been applied to the porous support makes the process more flexible and suitable for large scale production.

Groups which are curable both thermally and by irradiation include epoxy groups and ethylenically unsaturated groups such as (meth)acrylic groups, e.g. (meth)acrylate groups and (meth)acrylamide groups.

Typically the components used to form the PCP Polymer are selected such that they are reactive with each other. For example, a component having an epoxy group is reactive with a component comprising, for example, an amine, alkoxide, thiol or carboxylic acid group. One or more of the components used to form the PCP Polymer may also have more than one curable group. Components having an ethylenically unsaturated group may be reacted with other components by a free radical mechanism or, alternatively, with a nucleophilic component having for example one or more thiol or amine groups.

The PCP Polymer is preferably obtained by thermally curing a composition comprising:
(i) a component which is both thermally curable and radiation curable and which comprises dialkoxysilane groups and at least three epoxy groups;
(ii) a crosslinking agent which is copolymerisable with component (i) when heated; and
(iii) inert solvent; and optionally
(iv) a catalyst.

Preferably the amount of inert solvent present in the composition is from 5 to 95 wt %, more preferably 10 to 80 wt %, especially 30 to 70 wt %. For convenience, the inert solvent present in the above composition may also act as the inert solvent present in the composition used in step a) of the present process.

Component (i) preferably comprises at least three radiation-curable groups per molecule.

The alkyl groups in the dialkylsiloxane groups are preferably each independently $C_{1-4}$-alkyl groups, especially methyl groups.

Preferably component (i) is free from phenyl siloxane groups (e.g. of formula —(Si(Ph)$_2$-O)— groups wherein Ph is a phenyl or phenylene group).

Component (i) preferably has a number average molecular weight ("NAMW"), of 1 to 500 kDa, preferably 1 to 100 kDa, especially 2 to 50 kDa. The NAMW may be determined by any technique known in the art such as dynamic light scattering or size exclusion chromatography.

Component (i) is preferably present in an amount of 1 to 95 wt %, more preferably 5 to 75, especially 10 to 50 wt %, relative to the weight of the composition used to make the PCP Polymer.

As examples of component (i) there may be mentioned polydimethylsiloxane epoxy(meth)acrylates, epoxy modified polydimethylsiloxane(meth)acrylates, and allyl modified, vinyl modified, (meth)acrylic modified, epoxy-modified polydimethylsiloxanes and mixtures comprising two or more thereof.

Component (i) also comprises one or more thermally curable groups. This is necessary so that component (i) can cure thermally to provide the PCP Polymer.

Examples of crosslinking agents which may be used as component (ii) include: polydimethylsiloxane comprising two or more reactive groups, for example two or more groups selected from carboxylic acid, hydroxyl, thiol and/or anhydride groups, preferably polydimethylsiloxane having at least two of such groups (e.g. at both ends); (cyclo)aliphatic or aromatic di-, tri- or poly-carboxylic acids, e.g. succinic acid, glutaric acid, adipic acid, suberic acid, azelaic acid, sebacic acid, 1,2-benzenedicarboxylic acid, 1,3-benzenedicarboxylic acid, 1,4-benzenedicarboxylic acid, trimesic acid; (cyclo)aliphatic or aromatic di-, tri- or poly-thiols, e.g. 1,2-ethanedithiol, 1,4-butanedithiol, 1,6-hexanedithiol, benzene-1,2-dithiol, benzene-1,3-dithiol, benzene-1,4-dithiol, 1,2-benzenedimethanethiol, 1,3-benzenedimethanethiol, 1,4-benzenedimethanethiol or toluene-3,4-dithiol; (cyclo)aliphatic or aromatic di-, tri- or poly-amines, e.g. ethylenediamine, 1,2-diaminopropane, 1,3-diaminopropane, 1,4-diaminobutane, cadaverine, hexamethylenediamine, 1,8-diaminooctane, 1,2-bis(3-aminopropylamino)ethane, 1,2-diaminocyclohexane, 4-aminobenzylamine, o-xylylenediamine, o-phenylenediamine, m-phenylenediamine, p-phenylenediamine; or (cyclo)aliphatic or aromatic anhydrides, e.g. succinic anhydride, 3,3-dimethylglutaric anhydride, ethylenediaminetetraacetic dianhydride, glutaric anhydride, phenylsuccinic anhydride, pyromellitic dianhydride, or phthalic anhydride; metal alkoxides, e.g. alkoxides of zirconium, titanium or niobium, especially titanium (IV) isopropoxide, titanium (IV) ethoxide, zirconium propoxide and/or niobium ethoxide. Preferably the crosslinking agent comprises two (i.e. two and not more than two) reactive groups.

The composition used to make the PCP polymer preferably satisfies the equation:

$$(Mii \times Nii)/(Mi \times Ni)=Y$$

wherein:
Y is 0.01 to 0.99;
Mi is the number of moles of component (i);
Ni is the average number of thermally curable groups per mole of component (i).
Mii is the number of moles of component (ii); and
Nii is the average number of thermally curable groups per mole of component (ii).

Preferably Y is 0.02 to 0.50, more preferably 0.02 to 0.20.

The identity of thermally curable groups is not particularly limited and includes, for example epoxy groups, ethylenically unsaturated groups, benzoxazine groups, naphthoxazine groups, hydroxyl groups, isocyanate groups, propargyl groups, ethynyl groups and acetylene groups. Ethylenically unsaturated groups or epoxy groups may also be used to ensure the resultant PCP Polymer is radiation-curable.

The identity of the radiation-curable group(s) is not particularly limited and includes, for example, epoxy groups or ethylenically unsaturated groups such as allylic, vinylic, and (meth)acrylic groups.

The thermal cure step used to make the PCP Polymer, when performed, preferably takes place at a temperature in the range 60 to 150° C., more preferably 75 to 125° C. The thermal cure reaction may be stopped by cooling and/or diluting the thermally-curable composition as described above to give the desired PCP Polymer. For dilution, preferably the same material is used as for component (ii).

The crosslinking agent is useful for increasing the hydrodynamic radius of the resultant PCP Polymer, for example to a size which is more than the average pore size at the surface of the porous support. In this way, penetration of the curable composition into the pores of the porous support is reduced without having to impregnate the porous support with an inert solvent.

Examples of crosslinking agents which may be used as component (ii) include: alkoxides of zirconium, titanium or niobium, e.g. titanium (IV) isopropoxide, titanium (IV) ethoxide, zirconium propoxide and/or niobium ethoxide; polydimethylsiloxane comprising carboxylic acid, thiol or anhydride groups; (cyclo)aliphatic or aromatic di-, tri- or poly-carboxylic acids, e.g. succinic acid, glutaric acid, adipic acid, suberic acid, azelaic acid, sebacic acid, 1,2-benzenedicarboxylic acid, 1,3-benzenedicarboxylic acid, 1,4-benzenedicarboxylic acid, trimesic acid; (cyclo)aliphatic or aromatic di-, tri- or poly-thiols, e.g. 1,2-ethanedithiol, 1,4-butanedithiol, 1,6-hexanedithiol, benzene-1,2-dithiol, benzene-1,3-dithiol, benzene-1,4-dithiol, 1,2-benzenedimethanethiol, 1,3-benzenedimethanethiol, 1,4-benzenedimethanethiol or toluene-3,4-dithiol; (cyclo)aliphatic or aromatic di-, tri- or poly-amines, e.g. ethylenediamine, 1,2-diaminopropane, 1,3-diaminopropane, 1,4-diaminobutane, cadaverine, hexamethylenediamine, 1,8-diaminooctane, 1,2-bis(3-aminopropylamino)ethane, 1,2-diaminocyclohexane, 4-aminobenzylamine, o-xylylenediamine, o-phenylenediamine, m-phenylenediamine, p-phenylenediamine; or (cyclo)aliphatic or aromatic anhydrides, e.g. succinic anhydride, 3,3-dimethylglutaric anhydride, ethylenediaminetetraacetic dianhydride, glutaric anhydride, phenylsuccinic anhydride, pyromellitic dianhydride, or phthalic anhydride.

The function of the inert solvent (iii) is to provide the composition used to make the PCP Polymer with a concentration suitable for the thermal crosslinking reaction to proceed efficiently. Typically the inert solvent used as component (iii) comprises one or more organic solvents, especially water-immiscible organic solvent(s). The inert solvent is referred to as "inert" because it is not curable.

As examples of inert solvents there may be mentioned: $C_5$-$C_{10}$ (cyclo)alkanes, benzene, alkylbenzenes (e.g. toluene), $C_3$-$C_{10}$ (optionally branched) ketones, $C_4$-$C_{10}$ cyclic ketones, $C_4$-$C_{10}$ (optionally branched) esters, $C_4$-$C_{10}$ cyclic esters, $C_4$-$C_{10}$ (optionally branched) ethers, $C_4$-$C_{10}$ cyclic ethers and especially n-heptane and n-octane. Preferably the inert solvent comprises one or more, especially from 1 to 8, of the abovementioned preferred inert solvents.

Suitable catalysts (IV) include, for example, amine, phosphonium and metal compounds, e.g. amines such as 2-ethylhexylamine, bis(2-ethylhexyl)amine, dodecyldimethylamine, n,n-dimethylbenzylamine, 2-ethylimidazole, 1,8-diazabicyclo[5.4.0]undec-7-ene, tetramethyl guanidine, tetrabutylammonium chloride, benzyltrimethyl ammonium bromide, benzyltrimethyl ammonium hydroxide, tetrabutyl ammonium hydroxide, crosslinked polyvinylpyridine, and polymer bound amines such as polymer bound 1,4-diazabicyclo[2.2.2]octane hydrochloride, polymer bound 1,8-diazabicyclo[5.4.0]undec-7-ene and polymer bound tetraalkylammonium carbonate; phosphonium compounds such as tetrabutyl phosphonium bromide, pentyltriphenylphosphonium bromide, polymer bound triphenylphosphonium chloride; metal compounds such as titanium (iv) isopropoxide, diisopropoxytitanium-bis-(acetylacetonate), titanium (iv) 2-ethylhexyloxide, titanium (iv) butoxide, titanium butylphosphate, zirconium (iv) propoxide, zirconium (iv) ethoxide, zirconium (iv) acetylacetonate, zirconium (iv) bis(diethyl citrato)-dipropoxide, niobium ethoxide, aluminum acetylacetonate, aluminum lactate, bismuth octoate, calcium octoate, cerium naphthenate, chromium (iii) 2-ethylhexanoate, cobalt octoate, copper (ii) acetylacetonate, iron (iii) acetylacetonate, magnesium 2,4-pentadionate, manganese naphthenate, nickel acetylacetonate, stannous octoate, titanium ethyl acetoacetate chelate, titanium acetylacetonate chelate, titanium triethanolamine chelate, zinc acetate, zinc acetylacetonate, zinc di-2-ethylhexyldithio-phosphate, zinc nitrate, zinc octoate, zirconium 6-methylhexanedione, zirconium octoate, zirconium (iv) trifluoroacetylacetone, and the like. Catalysts generally are used in concentrations ranging from about 0.004 to about 1 wt %, preferably from about 0.01 to about 0.5 wt %, relative to the total weight of curable components.

The radiation-curable composition used in step a) preferably comprises:
(1) 0.5 to 50 wt % of PCP Polymer;
(2) 0.01 to 5 wt % of photo-initiator; and
(3) 50 to 99.5 wt % of inert solvent;
provided that the composition is substantially free from mono-epoxy compounds.

In order for the PCP Polymer to be radiation-curable, it preferably has at least at least two epoxy groups. Epoxy groups are preferred because their cure is usually not inhibited by presence of oxygen. The PCP polymers often have a high affinity for oxygen and this oxygen can sometimes inhibit the curing of other curable groups.

The PCP Polymer optionally comprises further radiation-curable groups, in addition to the at least two epoxy groups. Such further radiation curable groups include ethylenically unsaturated groups (e.g. (meth)acrylic groups (e.g. $CH_2=CR-C(O)-$ groups), especially (meth)acrylate groups (e.g. $CH_2=CR-C(O)O-$ groups) and/or (meth) acrylamide groups (e.g. $CH_2=CR-C(O)NR-$ groups), wherein each R independently is H or $CH_3$). The preferred ethylenically unsaturated groups are acrylate groups because of their fast polymerisation rates, especially when the irradiation in step b) uses UV light. Many compounds having acrylate groups are also easily available from commercial sources.

During our studies we discovered that certain, commercially available photo-initiators contain mono-epoxy compounds comprising a $C_{10-16}$-alkyl group. These are included in the photo-initiators to act as a reactive diluent. We found that by substantially removing such compounds from the photo-initiator, or by using photo-initiators which are free from such compounds, the $CO_2/CH_4$ selectivity of the membranes derived from PCP Polymers could be increased.

Preferably the photo-initiator is a type I and/or type II photo-initiator.

Examples of radical type I photo-initiators are as described in WO 2007/018425, page 14, line 23 to page 15, line 26, which are incorporated herein by reference thereto.

Examples of radical type II photo-initiators are as described in WO 2007/018425, page 15, line 27 to page 16, line 27, which are incorporated herein by reference thereto.

For PCP Polymers comprising one or more acrylate group, type I photo-initiators are preferred. Especially alpha-hydroxyalkylphenones, such as 2-hydroxy-2-methyl-1-phenyl propan-1-one, 2-hydroxy-2-methyl-1-(4-tert-butyl-)phenylpropan-1-one, 2-hydroxy-[4'-(2-hydroxypropoxy) phenyl]-2-methylpropan-1-one, 2-hydroxy-1-[4-(2-hydroxyethoxy)phenyl]-2-methyl propan-1-one, 1-hydroxycyclohexylphenylketone and oligo[2-hydroxy-2-methyl-1-{4-(1-methylvinyl)phenyl}propanone], alpha-aminoalkylphenones, alpha-sulfonylalkylphenones and acylphosphine oxides such as 2,4,6-trimethylbenzoyl-diphenylphosphine oxide, ethyl-2,4,6-trimethylbenzoyl-phenylphosphinate and bis(2,4,6-trimethylbenzoyl)-phenylphosphine oxide, are preferred.

Cationic photo-initiators are preferred because the PCP Polymer comprises curable groups such as epoxy-modified groups and may comprise other curable groups as oxetane, other ring-opening heterocyclic groups or vinyl ether groups.

Preferred cationic photo-initiators include organic salts of non-nucleophilic anions, e.g. hexafluoroarsinate anion, antimony (V) hexafluoride anion, phosphorus hexafluoride anion, tetrafluoroborate anion and tetrakis (2,3,4,5,6-pentafluorophenyl)boramide anion.

To ensure that the photo-initiator is substantially free from mono-epoxy compounds, one may select a commercially available photo-initiator which is free from such compounds, or one may remove such compounds from a commercially available photo-initiator which contains such compounds.

Examples of commercially available photo-initiators which are free from mono-epoxy compounds include, for example, hexafluoroantimonate salts, pentafluorohydroxyantimonate salts, hexafluorophosphate salts and hexafluoroarsenate salts. Among these photo-initiators, sulphonium salts and iodonium salts are preferably used.

Examples of suitable sulphonium salts include triphenylsulphonium hexafluorophosphate, triphenylsulphonium hexafluoroantimonate, triphenylsulphonium tetrakis(pentafluorophenyl)borate, 4,4'-bis[diphenylsulphonio]diphenylsulfide bishexafluorophosphate, 4,4'-bis[di(beta-hydroxyethoxy)phenylsulphonio]diphenylsulfide bishexafluoroantimonate, 4,4'-bis[di(beta-hydroxyethoxy)phenylsulphonio]diphenylsulfide bishexafluorophosphate, 7-[di(p-toluyl)sulphonio]-2-isopropylthioxanthone hexafluoroantimonate, 7-[di(p-toluyl)sulphonio]-2-isopropylthioxanthone tetrakis(pentafluorophenyl)borate, 4-phenylcarbonyl-4'-diphenylsulphonio-diphenylsulphide hexafluorophosphate, 4-(p-tert-butylphenylcarbonyl)-4'-diphenylsulphonio-diphenylsulphide hexafluoroantimonate, and 4-(p-tert-butylphenylcarbonyl)-4'-di(p-toluyl)sulphonio-diphenylsulphide tetrakis(pentafluorophenyl)borate (e.g. DTS-102, DTS-103, NDS-103, TPS-103 and MDS-103 from Midori Chemical Co. Ltd.).

Examples of suitable iodonium salts include phenyliodonium hexafluoroantimonate (e.g. CD-1012 from Sartomer Corp.), diphenyliodonium tetrakis(pentafluorophenyl)borate, diphenyliodonium hexafluorophosphate, diphenyliodonium hexafluoroantimonate, bis(dodecylphenyl)iodonium hexafluoroantimonate, and di(4-nonylphenyl)iodonium hexafluorophosphate. MPI-103, BBI-103 from Midori Chemical Co. Ltd. may also be used, as may certain iron salts (e.g. Irgacure™ 261 from Ciba).

Preferred commercially available photo-initiators free from epoxy compounds include 4-isopropyl-4'-methyldiphenyliodonium tetrakis(pentafluorophenyl)borate (($C_{40}H_{18}BF_{20}I$)) available under the name I0591 from TCI) and 4-(octyloxy)phenyl](phenyl)iodonium hexafluoroantimonate ($C_{20}H_{26}F_6IOSb$, available as AB153366 from ABCR GmbH Co).

The presence/absence and amount of mono-epoxy compounds may be determined by, for example, gas-liquid chromatography and/or mass spectroscopy.

One may substantially remove mono-epoxy compounds found photo-initiators which contain such compounds by standard purification techniques, for example by column chromatography or recrystallisation as appropriate.

The preferred curable composition contains less than 0.1 wt %, more preferably less than 0.05 wt %, especially less than 0.01 wt % of mono-epoxy compounds. Most preferably the curable composition is free from mono-epoxy compounds.

Preferably the weight ratio of photo-initiator to radiation-curable components present in the radiation-curable composition is between 0.001 and 0.2 to 1, more preferably between 0.01 and 0.1 to 1. It is preferred to minimize the amount of photo-initiator used, in other words preferably all photo-initiator has reacted after step b). A single type of photo-initiator may be used but also a combination of several different types.

The function of the inert solvent (3) is to provide the radiation-curable composition with a viscosity suitable for the particular method used to apply the curable composition to the porous support. For high speed application processes one will usually choose an inert solvent of low viscosity. The number of parts of component (3) is preferably 70 to 99.5 wt %, more preferably 80 to 99 wt %, especially 90 to 98 wt %.

The inert solvent is preferably selected from the solvents described above for the preparation of the PCP Polymer.

The radiation-curable composition may contain other components, for example surfactants, surface tension modifiers, viscosity enhancing agents, biocides, other components capable of co-polymerisation with the PCP Polymer or other ingredients.

The radiation-curable composition may be applied to the porous support by any suitable coating technique, for example by curtain coating, meniscus type dip coating, kiss coating, pre-metered slot die coating, reverse or forward kiss gravure coating, multi roll gravure coating, spin coating and/or slide bead coating.

Conveniently the radiation-curable composition may be coated onto the support by a multilayer coating method, for example using a consecutive multilayer coating method to perform steps a) and c) either side of an irradiation source for performing step b).

In a preferred consecutive multilayer process a layer of the radiation-curable composition and the discriminating layer (or a composition used to form the discriminating layer) are applied consecutively to the support, with the radiation-curable composition being applied before the discriminating layer.

In order to produce a sufficiently flowable composition for use in a high speed coating machine, the radiation-curable composition preferably has a viscosity below 4000 mPa·s when measured at 25° C., more preferably from 0.4 to 1000 mPa·s when measured at 25° C. Most preferably the viscosity of the radiation-curable composition is from 0.4 to 500 mPa·s when measured at 25° C. For coating methods such as slide bead coating the preferred viscosity is from 1 to 100 mPa·s when measured at 25° C. The desired viscosity is preferably achieved by controlling the amount of solvent in the radiation-curable composition and/or by the conditions for preparing the radiation curable polymer.

In the multi-layer coating methods mentioned above one may optionally apply a lower inert solvent layer to the porous support followed by applying the radiation-curable composition.

With suitable coating techniques, coating speeds of at least 5 m/min, e.g. at least 10 m/min or even higher, such as 15 m/min, 20 m/min, or even up to 100 m/min, can be reached. In a preferred embodiment the radiation-curable composition is applied to the support at one of the aforementioned coating speeds.

The thickness of the cured polymer on the support may be influenced by controlling the amount of curable composition per unit area applied to the support. For example, as the amount of curable composition per unit area increases, so does the thickness of the resultant gutter layer. The same principle applies to formation of the discriminating layer and the optional protective layer.

While it is possible to practice the invention on a batch basis with a stationary porous support, to gain full advantage of the invention it is much preferred to perform the process on a continuous basis using a moving porous support, e.g. the porous support may be in the form of a roll which is unwound continuously or the porous support may rest on a continuously driven belt. Using such techniques the radiation-curable composition can be applied to the porous support on a continuous basis or it can be applied on a large batch basis. Removal of the inert solvent from the radiation-curable composition can be accomplished at any stage after the radiation-curable composition has been applied to the support, e.g. by evaporation.

Thus in a preferred process, the radiation-curable composition is applied continuously to the porous support in step a) by means of a manufacturing unit comprising a radiation-curable composition application station, step b) is performed using an irradiation source located downstream from the radiation-curable composition application station, the discriminating layer is formed on the layer of cured polymer in step c) by a discriminating layer application station and the resultant composite membrane is collected at a collecting station, wherein the manufacturing unit comprises a means for moving the porous support from the radiation-curable composition application station to the irradiation source and to the discriminating layer application station and to the composite membrane collecting station.

Optionally the discriminating layer is formed on the gutter layer by a radiation curing process. Under such circumstances, the manufacturing unit preferably further comprises an irradiation source or a heater located downstream from the discriminating layer application station, thereby radiation- or thermally-curing the components used to form the discriminating layer.

The radiation-curable composition application station may be located at an upstream position relative to the irradiation source and the irradiation source is located at an upstream position relative to the discriminating layer application station, such that the process steps occur in the order (b), (c), (d) (when present).

If desired step c) may be performed using a different manufacturing unit from that used to perform step a). Thus one may perform steps a) and b), store the product of step b), then perform step c) and optionally step d) later either using the same manufacturing unit used for steps a) and b) or a different manufacturing unit.

The gutter layer (formed in step b)) usually has the function of providing a smooth and continuous surface for the discriminating layer. While it is preferred for the gutter layer to be pore-free, the presence of some pores usually does not reduce the permselectivity of the final membrane because the discriminating layer is often able to fill minor defects in the gutter layer.

The gutter layer preferably has a thickness of 25 to 800 nm, preferably 30 to 600 nm, especially 50 to 500 nm, e.g. 70 to 400 nm, or 80 to 300 nm, or 90 to 200 nm. The thickness may be determined by cutting through the layer and examining its cross section using a scanning electron microscope. "Thickness" refers to the part of the gutter layer which is present on top of the porous support and is an average value. The part of the radiation curable composition which is present within the pores of the support is not taken into account.

The gutter layer is preferably essentially nonporous, i.e. any pores present therein have an average diameter <1 nm. This does not exclude the presence of defects which may be significantly larger. Defects may be corrected by the discriminating layer as described above.

The irradiation step b) may be performed using any source which provides the wavelength and intensity of radiation necessary to cause the radiation-curable composition to polymerise. For example, electron beam, UV, visible and/or infra red radiation may be used to cure the composition, the appropriate radiation being selected to match the composition. For UV curing a mercury arc lamp is particularly effective, but light emitting diodes can also be used.

Preferably radiation curing of the radiation-curable composition begins within 7 seconds, more preferably within 5 seconds, most preferably within 3 seconds, of the radiation-curable composition being applied to the porous support.

Preferably the curing is achieved by irradiating the radiation-curable composition for less than 30 seconds, more preferably less than 10 seconds, e.g. less than 5 seconds.

In step b) the radiation-curable composition is preferably irradiated with ultraviolet light or an electron beam.

Preferably the irradiation referred to in step b) uses ultraviolet light. Suitable wavelengths are for instance UV-A (400 to >320 nm), UV-B (320 to >280 nm), UV-C (280 to 200 nm), provided the wavelength matches with the absorbing wavelength of the photo-initiator included in the composition.

Suitable sources of ultraviolet light include mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized.

The discriminating layer preferably has pores of average diameter below 2 nm, preferably below 1 nm, and preferably is substantially non-porous. Preferably the discriminating layer has a very low permeability to liquids.

The discriminating layer preferably has a dry thickness of 10 to 300 nm, more preferably 10 to 150 nm, especially 20 to 100 nm.

The dry thickness may be determined by cutting through the composite membrane and measuring the thickness of the discriminating layer above the gutter layer using a scanning electron microscope.

The composition used to make the discriminating layer preferably comprises a polymer, an inert solvent and optionally an initiator. The inert solvent may be any solvent capable of dissolving the polymer used to form the discriminating layer. Suitability of the solvent is determined by the properties of the polymer and the concentration desired. Suitable solvents include water, $C_{5-10}$-alkanes, e.g. cyclohexane, heptane and/or octane; alkylbenzenes, e.g. toluene, xylene and/or $C_{10}$-$C_{16}$ alkylbenzenes; $C_{1-6}$-alkanols, e.g. methanol, ethanol, n-propanol, isopropanol, n-butanol, sec-butanol, tert-butanol, n-pentanol, cyclopentanol and/or cyclohexanol; linear amides, e.g. dimethylformamide or dimethylacetamide; ketones and ketone-alcohols, e.g. acetone, methyl ether ketone, methyl isobutyl ketone, cyclohexanone and/or diacetone alcohol; ethers, e.g. tetrahydrofuran and/or dioxane; diols, preferably diols having from 2 to 12 carbon atoms, e.g. pentane-1,5-diol, ethylene glycol, propylene glycol, butylene glycol, pentylene glycol, hexylene glycol and/or thiodiglycol; oligo- and poly-alkyleneglycols, e.g. diethylene glycol, triethylene glycol, polyethylene glycol and/or polypropylene glycol; triols, e.g. glycerol and/or 1,2,6-hexanetriol; mono-$C_{1-4}$-alkyl ethers of diols, preferably mono-$C_{1-4}$-alkyl ethers of diols having 2 to 12 carbon atoms, e.g. 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and/or ethyleneglycol monoallylether; cyclic amides, e.g. 2-pyrrolidone, N-methyl-2-pyrrolidone, N-ethyl-2-pyrrolidone, caprolactam and/or 1,3-dimethylimidazolidone; cyclic esters, e.g. caprolactone; sulphoxides, e.g. dimethyl sulphoxide and/or sulpholane; and mixtures comprising two or more of the foregoing.

The discriminating layer is generally polymeric in nature. Preferred discriminating layers comprise a polyimide, cellulose acetate, polybenzoxazole, polyethyleneoxide or polyetherimide, especially a polyimide comprising trifluoromethyl groups.

A particularly preferred discriminating layer comprises a polyimide comprising groups of the Formula (1):

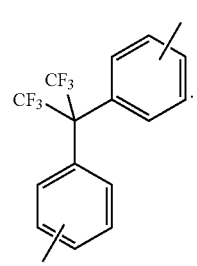

Formula (1)

Polyimides comprising trifluoromethyl groups may be prepared by, for example, the general methods described in U.S. Pat. Reissue No. 30,351 (based on U.S. Pat. No. 3,899,309) U.S. Pat. No. 4,717,394 and U.S. Pat. No. 5,085,676.

The composition used to prepare the discriminating layer preferably comprises less than 0.1 wt %, more preferably less than 0.05 wt %, especially less than 0.01 wt % of mono-epoxy compounds. Most preferably the composition used to prepare the discriminating layer is free from mono-epoxy compounds.

When the discriminating layer is cured after applying it to the gutter layer the composition used to prepare the discriminating layer preferably comprises an initiator, preferably a thermal initiator or a photo-initiator. The initiator may be selected from those described above for the gutter layer.

Preferably the discriminating layer is obtained from a composition which is free from mono-epoxy compounds comprising a $C_{10-16}$-alkyl group, more preferably free from epoxy compounds having a molecular weight below 300 or 400 Daltons.

The discriminating layer may be formed on the gutter layer by any suitable technique, for example by a process comprising any of the coating methods described above in relation to preparation of the gutter layer.

For improving the adhesion of the discriminating layer to the gutter layer the latter may be treated by a corona discharge or plasma treatment before forming the discriminating layer thereon. For the corona or plasma treatment generally an energy dose of 0.5 to 100 $kJ/m^2$ will be sufficient.

The optional protective layer may be formed on the discriminating layer by any suitable technique, for example by a process comprising any of the coating methods described above in relation to preparation of the gutter layer.

The protective layer, when present, preferably is highly permeable to the gases or vapours that are to be separated. Preferably the protective layer comprises dialkylsiloxane groups.

The protective layer optionally has surface characteristics which influence the functioning of the composite membrane, for example by making the membrane surface more hydrophilic or hydrophobic.

The composite membrane preferably has a water permeability at 20° C. of less than $6 \cdot 10^{-8}$ $m^3/m^2 \cdot s \cdot kPa$, more preferably less than $3 \cdot 10^{-8}$ $m^3/m^2 \cdot s \cdot kPa$.

The overall dry thickness of the composite membrane will typically be 20 to 500 μm, preferably from 30 to 300 μm.

Steps a) to d) (when d) is performed) are preferably performed sequentially as part of a continuous process for preparing the composite membrane.

In one embodiment, step a) comprises meniscus type dip coating of the radiation-curable composition onto the porous support and the discriminating layer (or the components from which the discriminating layer is derived) is applied to the cured polymer in step c) by reverse kiss gravure coating, meniscus type dip coating or pre-metered slot die coating. Alternatively the radiation-curable composition may be applied to the support by pre-metered slot die coating or multi roll gravure coating. The radiation-curable composition and the discriminating layer may also be applied by curtain coating.

For production on a small scale, it is convenient to perform all of steps a), c) and d) (when performed) by reverse kiss gravure coating, forward kiss gravure coating, meniscus type dip coating, pre-metered slot die coating or spin coating.

A three-roll offset gravure coating may also be used, especially when the compositions to be applied to the support etc. have relatively high viscosity.

The process of the present invention may contain further steps if desired, for example washing and/or drying one or more of the various layers and removing the inert solvent from the composite membrane, e.g. by evaporation.

According to a second aspect of the present invention there is provided a composite membrane comprising:
i) a porous support;
ii) a gutter layer obtained from curing a radiation-curable composition comprising a photoinitiator and a partially crosslinked, radiation-curable polymer comprising epoxy groups and siloxane groups, said composition being substantially free from mono-epoxy compounds; and
iii) a discriminating layer on the gutter layer.

Preferably the discriminating layer in the composite membrane according to the second aspect of the present invention has been obtained from a composition which is substantially free from mono-epoxy compounds.

The porous support, gutter layer and discriminating layer of the composite membrane according to the second aspect of the present invention are preferably as described above in relation to the first aspect of the present invention.

Preferably the composite membrane according to the second aspect of the present invention is obtained by a process according to the first aspect of the present invention.

The discriminating layer preferably comprises a polyimide, especially a polyimide comprising trifluoromethyl groups.

A further aspect of the present invention provides a gas separation module for separating a feed gas containing a target gas into a gas stream rich in the target gas and a gas stream depleted in the target gas, the module comprises a housing and one or more cartridges comprising a composite membrane according to the second aspect of the present invention.

A still further aspect of the present invention provides a gas separation cartridge comprising a composite membrane according to the second aspect of the present invention.

The composite membrane (which may also be referred to as a gas separation element) is preferably in tubular or, more preferably, in sheet form. Tubular forms of membrane are sometimes referred to as being of the hollow fibre type. Membranes in sheet form are suitable for use in, for example, spiral-wound, plate-and-frame and envelope cartridges.

The composite membranes are particularly suitable for separating a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, and $N_2$.

The target gas may be, for example, a gas which has value to the user of the composite membrane and which the user wishes to collect. Alternatively the target gas may be an undesirable gas, e.g. a pollutant or 'greenhouse gas', which the user wishes to separate from a gas stream in order to protect the environment.

The composite membranes are particularly useful for purifying natural gas (a mixture which comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The composite membranes of the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

Preferably the composite membrane has a $CO_2/CH_4$ selectivity ($\alpha CO_2/CH_4$)>20. Preferably the selectivity is determined by a process comprising exposing the membrane to a 13:87 mixture by volume of $CO_2$ and $CH_4$ at a feed pressure of 6000 kPa and a temperature of 40° C.

Preferably the composite membrane has a $CO_2/N_2$ selectivity ($\alpha CO_2/N_2$)>35. Preferably the selectivity is determined by a process comprising exposing the membrane to $CO_2$ and $N_2$ separately at feed pressures of 2000 kPa and a temperature of 40° C.

While this specification emphasises the usefulness of the composite membranes of the present invention for separating gases, especially polar and non-polar gases, it will be understood that the composite membranes can also be used for other purposes, for example providing a reducing gas for the direct reduction of iron ore in the steel production industry, dehydration of organic solvents (e.g. ethanol dehydration), pervaporation and vapour separation and also for breathable apparel.

The invention is now illustrated by the following non-limiting examples in which all parts and percentages are by weight unless otherwise specified. ("Comp" means Comparative).

The following materials were used in the Examples:

PAN is a porous support polyacrylonitrile L10 ultrafiltration membrane from GMT Membrantechnik GmbH, Germany.

UV9300 is SilForce™ UV9300 from Momentive Performance Materials Holdings. This is thermally curable copolymer comprising at least 3 epoxy groups and linear polydimethyl siloxane chains. Furthermore, this copolymer cures rapidly when irradiated with UV light in the presence of a photo-initiator.

UV9390C is SilForce™ UV-9390C—a cationic photo-initiator (a solution of a bis(4-alkylaryl)iodonium hexafluoroantimonate salt, a photosensitizer and about 28 wt % of mono epoxy compounds (a mixture glycidyl $C_{12}$, $C_{14}$ or $C_{16}$-alkyl ether, as judged by GC-MS).

I0591 is 4-isopropyl-4'-methyldiphenyliodonium tetrakis (pentafluorophenyl)borate ($C_{40}H_{18}BF_{20}I$) from TCI (a photo-initiator which is free from mono-epoxy compounds).

AB153366 is 4-(Octyloxy)phenyl](phenyl)iodonium hexafluoroantimonate(1-) ($C_{20}H_{26}F_6IOSb$) from ABCR GmbH Co (a photo-initiator which is free from mono-epoxy compounds).

Ti(OiPr)$_4$ is titanium (IV) isopropoxide from Dorf Ketal Chemicals.

n-Heptane is n-heptane from Brenntag Nederland BV

MEK is 2-butanone from Brenntag Nederland BV

CH is cyclohexanone from Brenntag Nederland BV

PI is poly([({2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{5-carboxylic-1,3-phenylenediamine}-alt-{5,5'-[2,2,2-trifluoro-1-(trifluoromethyl)ethane-1,1-diyl]bis(isobenzofuran-1,3-dione)}]) obtained from Fujifilm Corporation GE is a mixture of monoepoxy compounds (from Aldrich, catalog number 412848 technical grade), believed to have the following formula:

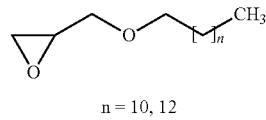

n = 10, 12

CA is cellulose acetate L-70 from Daicel Chemical Industries Ltd.

PBA is polybenzoxazole:{[2,2-bis(4-carboxyphenyl)-hexafluoropropane]-alt-[2,2-Bis(3-amino-4-methylphenyl)-hexafluoropropane]} from Fujifilm Corporation.

Evaluation of Gas Permeability & Selectivity

In the following Examples gas permeability and selectivity of the composite membranes was determined as follows:

(A) Gas Flux

The flux of $CH_4$ and $CO_2$ through the obtained composite membrane was measured at 40° C. and gas feed pressure of 6000 kPa using a gas permeation cell with a measurement diameter of 3.0 cm and a feed gas composition of 13 v/v % $CO_2$ and 87 v/v % $CH_4$.

Flux of each gas was calculated based on the following equation:

$$Q_i = (\theta_{Perm} \cdot X_{Perm,i}) / (A \cdot (P_{Feed} \cdot X_{Feed,i} - P_{Perm} \cdot X_{Perm,i}))$$

wherein:

$Q_i$=Flux of each gas (m³(STP)/m²·kPa·s)
$\theta_{Perm}$=Permeate flow (m³(STP)/s)
$X_{Perm,i}$=Volume fraction of each gas in the permeate
$A$=Membrane area (m²)
$P_{Feed}$=Feed gas pressure (kPa)
$X_{Feed,i}$=Volume fraction of each gas in the feed
$P_{Perm}$=Permeate gas pressure (kPa)

STP is standard temperature and pressure, which is defined here as 25.0° C. and 1 atmosphere (101.325 kPa).

(B) Selectivity

Selectivity ($\alpha_{CO2/CH4}$) was calculated from $Q_{CO2}$ and $Q_{CH4}$ calculated above, based on following equation:

$$\alpha_{CO2/CH4} = Q_{CO2}/Q_{CH4}$$

Viscosity was measured using a Brookfield LVDV-II+ PCP viscosity meter, using either spindle CPE-40 or CPE-52 depending on viscosity range.

EXAMPLES AND COMPARATIVE EXAMPLES

Stage a) Preparation of the PCP Polymer

A solution of a PCP Polymer ("PCP Polymer 1") was prepared by heating the components described in Table 1 together for 105 hours at 95° C. The resultant solution of PCP Polymer 1 had a viscosity of about 64,300 mPas when measured at 25° C.

TABLE 1

Ingredients used to prepare PCP Polymer 1

| Ingredient | Amount (w/w %) |
|---|---|
| UV9300 | 75 |
| Ti(OiPr)$_4$ | 1.5 |
| n-Heptane | 23.5 |

Stage b) Preparation of Radiation Curable Compositions ("RCC"s) 1 to 5

Portions of the solution of PCP Polymer 1 obtained in stage a) above were cooled to 20° C., diluted with n-heptane and then filtered through a filter paper having an average pore size of 2.7 μm. The remaining ingredients indicated in Table 2 below were added to make RCC1 to 5 as indicated in Table 2 below.

TABLE 2

| | | RCC1 (comp.) | RCC2 | RCC3 | RCC4 (comp.) | RCC5 (comp.) |
|---|---|---|---|---|---|---|
| Inert solvent | n-Heptane (w/w %) | 84.9 | 84.9 | 84.9 | 84.8 | 84.1 |
| | MEK (w/w %) | 1.6 | 1.6 | 1.6 | 1.6 | 1.6 |
| PCP Polymer | PCP Polymer 1 (w/w %) | 13.3 | 13.3 | 13.3 | 13.3 | 13.3 |
| Photo-initiator | UV-9390c[1] (w/w %) | 0.2 | 0 | 0 | 0 | 1.0 |
| | I0591[2] (w/w %) | 0 | 0.2 | 0 | 0.2 | 0 |
| | AB153366[2] (w/w %) | 0 | 0 | 0.2 | 0 | 0 |
| Epoxy compound | GE (w/w %) | 0 | 0 | 0 | 0.1 | 0 |

Notes:
[1] The commercial form of UV-9390c contained about 28 wt % of mono-epoxy compounds. Therefore CEX1 and CEX3 contain epoxy compounds derived from the UV-9390c.
[2] I0591 and AB153366 contained no detectable mono-epoxy compounds.
3. Comp. means Comparative.

Stage c) Preparation of Compositions Used to Form a Discriminating Layer

Compositions DSL1 to DSL9 were prepared by mixing the components shown in Table 3 and filtering the mixtures through a filter paper having an average pore size of 2.7 μm.

TABLE 3

| | DSL1 | DSL2 | DSL3 | DSL4 | DSL5 | DSL6 | DSL7 | DSL8 | DSL9 |
|---|---|---|---|---|---|---|---|---|---|
| PI (w/w %) | 2.00 | 2.00 | 2.00 | 0 | 0 | 0 | 0 | 0 | 0 |
| CA (w/w %) | 0 | 0 | 0 | 1.3 | 1.3 | 1.3 | 0 | 0 | 0 |
| PBA (w/w %) | 0 | 0 | 0 | 0 | 0 | 0 | 1.3 | 1.3 | 1.3 |
| CH (w/w %) | 6.00 | 6.00 | 6.00 | 94.9 | 94.77 | 94.77 | 0 | 0 | 0 |
| MEK (w/w %) | 92.00 | 91.8 | 91.6 | 3.8 | 3.8 | 3.8 | 0 | 0 | 0 |
| THF | 0 | 0 | 0 | 0 | 0 | 0 | 98.7 | 98.57 | 98.57 |
| GE | 0 | 0.2 | 0.4 | 0 | 0 | 0 | 0 | 0 | 0 |
| UV-9390c (w/w %) | 0 | 0 | 0 | 0 | 0.13 | 0 | 0 | 0.13 | 0 |
| I0591 (w/w %) | 0 | 0 | 0 | 0 | 0 | 0.13 | 0 | 0 | 0.13 |

Stage d) Preparation of Composite Membranes

Composite membranes were prepared using the combinations of radiation-curable composition and discriminating layers described in Table 4.

The radiation-curable compositions RCC1 to 5 were applied to a porous PAN substrate (step a)) at a speed of 10 m/min by a meniscus dip coating and irradiated. Irradiation (step b)) was performed using a Light Hammer LH10 from Fusion UV Systems fitted with a D-bulb and irradiating with an intensity of 16.8 kW/m (70%). The resultant gutter layers had a dry thickness of 300 nm. Discriminating layers were formed on the gutter layers (step c)) using the compositions DSL1 to DSL9 as indicated in Table 4, using a meniscus type coating T 10 m/min coating speed. In Examples 1 to 4 and CEx1 to CEx4, the discriminating layers comprised PI. In Examples 5, 6 and 7, the discriminating layers comprised cellulose acetate. In Examples 8, 9 and 10, the discriminating layers comprised a polybenzoxazole.

After steps a) to c) had been completed, the resultant composite membranes were dried and tested. The test results are shown in Table 4 below.

TABLE 4

| Example | CEx1 | Ex1 | Ex2 | CEx2 | CEx3 | Ex3 | Ex4 | CEx4 | Ex5 | Ex6 | Ex7 | Ex8 | Ex9 | Ex10 |
|---|---|---|---|---|---|---|---|---|---|---|---|---|---|---|
| Radiation-curable Composition | RCC1 | RCC2 | RCC3 | RCC4 | RCC5 | RCC2 | RCC2 | RCC1 | RCC2 | RCC2 | RCC2 | RCC2 | RCC2 | RCC2 |
| Coating speed (m/min) | 10 | 10 | 10 | 10 | 10 | 10 | 10 | 10 | 10 | 10 | 10 | 10 | 10 | 10 |
| Coating amount (ml/m$^2$) | 3 | 3 | 3 | 3 | 3 | 3 | 3 | 3 | 3 | 3 | 3 | 3 | 3 | 3 |
| Dry layer thickness of gutter layer (nm) | 300 | 300 | 300 | 300 | 300 | 300 | 300 | 300 | 300 | 300 | 300 | 300 | 300 | 300 |

TABLE 4-continued

| Example | CEx1 | Ex1 | Ex2 | CEx2 | CEx3 | Ex3 | Ex4 | CEx4 | Ex5 | Ex6 | Ex7 | Ex8 | Ex9 | Ex10 |
|---|---|---|---|---|---|---|---|---|---|---|---|---|---|---|
| Discriminating layer composition | DSL1 | DSL1 | DSL1 | DSL1 | DSL1 | DSL2 | DSL3 | DSL2 | DSL4 | DSL5 | DSL6 | DSL7 | DSL8 | DSL9 |
| Coating amount (ml/m$^2$) | 8.4 | 8.4 | 8.4 | 8.4 | 8.4 | 8.4 | 8.4 | 8.4 | 8.4 | 8.4 | 8.4 | 8.4 | 8.4 | 8.4 |
| Dry layer thickness of discriminating layer (nm) | 120 | 120 | 120 | 120 | 120 | 120 | 120 | 120 | 120 | 120 | 120 | 120 | 120 | 120 |
| $Q_{CO2}$ of composite membrane (cm$^3$(STP)/cm$^2$·cm Hg·s) | 63×10$^{-6}$ | 60×10$^{-6}$ | 61×10$^{-6}$ | 63×10$^{-6}$ | 65×10$^{-6}$ | 65×10$^{-6}$ | 70×10$^{-6}$ | 72×10$^{-6}$ | 60×10$^{-6}$ | 40×10$^{-6}$ | 46×10$^{-6}$ | 190×10$^{-6}$ | 190×10$^{-6}$ | 185×10$^{-6}$ |
| $\alpha_{CO2/CH4}$ of composite membrane | 20 | 35 | 33 | 20 | 15 | 15 | 10 | 5 | 17 | 14 | 17 | 13 | 10 | 13 |

Examples 1 to 4 and Comparative Examples 1 to 4 illustrate composite membranes comprising a discriminating layer containing a polyimide. As can be seen from Table 4, for this discriminating later, the best selectivity ($\alpha_{CO2/CH4}$) was obtained from Examples 1 and 2 where both the gutter layer and the discriminating layer were obtained from compositions free from mono epoxy compounds. In Examples 3 and 4, the gutter layer was obtained from compositions free from mono epoxy compounds but the discriminating layer contained such compounds. The selectivity in Examples 3 and 4 was not as good as for Examples 1 and 2, but it was better than Comparative Example 4 where both the gutter layer and the discriminating layer were obtained from compositions containing mono epoxy compounds. Comparative Example 1 shows that the presence of mono epoxy compounds in the gutter layer reduces selectivity relative to Examples 1 and 2.

Example 5, 6 and 7 show results for composite membranes comprising a cellulose acetate discriminating layer. Examples 5 and 6, both of which comprised discriminating layers obtained from compositions free from epoxy compounds, had superior selectivity to Ex 7 (where the cellulose acetate discriminating layer was obtained from a composition containing mono-epoxy compounds).

Examples 8, 9 and 10 show results for composite membranes comprising a polybenzoxazole discriminating layer. Examples 8 and 10, both of which comprised discriminating layers obtained from compositions free from epoxy compounds, had superior selectivity to Example 9 (where the PBA discriminating layer was obtained from a composition containing mono-epoxy compounds).

The invention claimed is:

1. A process for preparing a composite membrane comprising the steps:
   a) applying a radiation-curable composition to a porous support;
   b) irradiating the composition and thereby forming a gutter layer of cured polymer; and
   c) forming a discriminating layer on the gutter layer;
   wherein the radiation-curable composition comprises a partially crosslinked, radiation-curable polymer comprising epoxy groups and siloxane groups, a photoinitiator and is substantially free from mono-epoxy compounds.

2. The process according to claim 1, wherein the radiation-curable composition contains less than 0.1 wt % of mono-epoxy compounds and the discriminating layer is formed from a composition containing less than 0.1 wt % of mono-epoxy compounds.

3. The process according to claim 1, wherein the radiation-curable composition contains less than 0.01 wt % of mono-epoxy compounds and the discriminating layer is formed from a composition containing less than 0.01 wt % of mono-epoxy compounds.

4. The process according to claim 1, wherein the radiation-curable composition is free from mono-epoxy compounds and the discriminating layer is formed from a composition which is free from mono-epoxy compounds.

5. The process according to claim 1, wherein the discriminating layer comprises a polyimide, cellulose acetate, polybenzoxazole, polyethyleneoxide or polyetherimide.

6. The process according to claim 1, wherein the discriminating layer comprises a polyimide comprising trifluoromethyl groups.

7. The process according to claim 1, wherein the discriminating layer comprises poly([({2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{5-carboxylic-1,3-phenylenediamine}-alt-{5,5'-[2,2,2-trifluoro-1-(trifluoromethyl)ethane-1,1-diyl]bis(isobenzofuran-1,3-dione)}]).

8. The process according to claim 1, wherein:
   the radiation-curable composition is applied continuously to the porous support in step a) by means of a manufacturing unit comprising a radiation-curable composition application station, step b) is performed using an irradiation source located downstream from the radiation-curable composition application station, the discriminating layer is formed on the layer of cured polymer in step c) by a discriminating layer application station, and the resultant composite membrane is collected at a collecting station, wherein the manufacturing unit comprises a means for moving the porous support from the radiation-curable composition application station to the irradiation source and to the discriminating layer application station and to the composite membrane collecting station.

9. The process according to any of the previous claim 1, wherein step a) and/or step b) is or are performed by curtain coating, meniscus type dip coating, kiss coating, pre-metered slot die coating, reverse or forward kiss gravure coating, multi roll gravure coating, spin coating and/or slide bead coating.

10. A composite membrane prepared by the method according claim 1.

11. A gas separation cartridge comprising the composite membrane according to claim 1 wherein the cartridge is of plate-and-frame, spiral-wound, hollow-fibre, tubular or envelope type.

12. The process according to claim 1 wherein:
 (a) the radiation-curable composition contains less than 0.1 wt % of mono-epoxy compounds;
 (b) the discriminating layer is formed from a composition containing less than 0.1 wt % of mono-epoxy compounds; and
 (c) the discriminating layer comprises poly([({2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{5-carboxylic-1,3-phenylenediamine}-alt-{5,5'-[2,2,2-trifluoro-1-(trifluoromethyl)ethane-1,1-diyl]bis(isobenzofuran-1,3-dione)}]).

13. The process according to claim 12 wherein the radiation-curable composition contains less than 0.01 wt % of mono-epoxy compounds and the discriminating layer is formed from a composition containing less than 0.01 wt % of mono-epoxy compounds.

14. The process according to claim 1 wherein:
 the radiation-curable composition is applied continuously to the porous support in step a) by means of a manufacturing unit comprising a radiation-curable composition application station, step b) is performed using an irradiation source located downstream from the radiation-curable composition application station, the discriminating layer is formed on the layer of cured polymer in step c) by a discriminating layer application station, and the resultant composite membrane is collected at a collecting station, wherein the manufacturing unit comprises a means for moving the porous support from the radiation-curable composition application station to the irradiation source and to the discriminating layer application station and to the composite membrane collecting station and wherein the discriminating layer comprises poly([({2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{5-carboxylic-1,3-phenylenediamine}-alt-{5,5'-[2,2,2-trifluoro-1-(trifluoromethyl)ethane-1,1-diyl]bis(isobenzofuran-1,3-dione)}]).

15. The process according to claim 14 wherein step a) and/or step b) is or are performed by curtain coating, meniscus type dip coating, kiss coating, pre-metered slot die coating, reverse or forward kiss gravure coating, multi roll gravure coating, spin coating and/or slide bead coating.

16. A composite membrane comprising:
 i) a porous support;
 ii) a gutter layer obtained from curing a radiation-curable composition comprising a photoinitiator and a partially crosslinked, radiation-curable polymer comprising epoxy groups and siloxane groups, said composition being substantially free from mono-epoxy compounds; and
 iii) a discriminating layer on the gutter layer.

17. The composite membrane according to claim 16 wherein the discriminating layer has been obtained from a composition which is substantially free from mono-epoxy compounds.

18. The composite membrane according to claim 16 wherein the discriminating layer comprises poly([({2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{5-carboxylic-1,3-phenylenediamine}-alt-{5,5'-[2,2,2-trifluoro-1-(trifluoromethyl)ethane-1,1-diyl]bis(isobenzofuran-1,3-dione)}]).

19. A gas separation cartridge comprising the composite membrane according to claim 16 wherein the cartridge is of plate-and-frame, spiral-wound, hollow-fibre, tubular or envelope type.

20. A gas separation cartridge comprising the composite membrane according to claim 17 wherein the cartridge is of plate-and-frame, spiral-wound, hollow-fibre, tubular or envelope type.

* * * * *